(12) United States Patent
Winton et al.

(10) Patent No.: US 11,503,401 B2
(45) Date of Patent: Nov. 15, 2022

(54) DUAL-ZONE AUTOMOTIVE MULTIMEDIA SYSTEM

(71) Applicant: HARMAN INTERNATIONAL INDUSTRIES, INCORPORATED, Stamford, CT (US)

(72) Inventors: Riley Winton, Opelika, AL (US); Christopher Ludwig, Bloomfield Hills, MI (US); Christopher Michael Trestain, Livonia, MI (US); Maxwell Boone Willis, Royal Oak, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/179,916

(22) Filed: Feb. 19, 2021

(65) Prior Publication Data

US 2021/0266661 A1 Aug. 26, 2021

Related U.S. Application Data

(60) Provisional application No. 62/979,811, filed on Feb. 21, 2020.

(51) Int. Cl.
| *H04R 1/32* | (2006.01) |
| *G10K 11/178* | (2006.01) |
| *B60K 35/00* | (2006.01) |
| *H04R 5/02* | (2006.01) |

(52) U.S. Cl.
CPC ............. *H04R 1/323* (2013.01); *B60K 35/00* (2013.01); *G10K 11/17823* (2018.01); *H04R 5/023* (2013.01); *B60K 2370/157* (2019.05); *H04R 2499/13* (2013.01)

(58) Field of Classification Search
CPC .... H04R 1/323; H04R 5/023; H04R 2499/13; G10K 11/17823; B60K 35/00; B60K 2370/157
USPC ...................................... 381/56, 58, 71.4, 86
See application file for complete search history.

(56) References Cited

U.S. PATENT DOCUMENTS

| 10,097,944 | B2 | 10/2018 | Christoph et al. |
| 2007/0038444 | A1* | 2/2007 | Buck ................... B60R 16/0373 704/235 |
| 2009/0136049 | A1 | 5/2009 | Opfer |
| 2017/0055078 | A1* | 2/2017 | Christoph .............. H04R 1/025 |
| 2018/0190282 | A1* | 7/2018 | Mohammad ........... H04R 3/005 |
| 2020/0223328 | A1* | 7/2020 | Kobayashi ............... B60N 2/14 |

FOREIGN PATENT DOCUMENTS

| EP | 2806663 A1 | 11/2014 |
| GB | 2546632 A | 7/2017 |
| WO | 2009012500 A2 | 1/2009 |

* cited by examiner

*Primary Examiner* — William A Jerez Lora
(74) *Attorney, Agent, or Firm* — Brooks Kushman, P.C.

(57) ABSTRACT

A dual-zone automotive multimedia system may include a first infotainment device associated with a front zone of a vehicle, at least one second infotainment device associated with a rear zone of a vehicle, wherein the at least one second infotainment device includes a directional loudspeaker arranged facing the rear zone of the vehicle, and a processor programmed to transmit audio signals to the first and second infotainment devices to create sound at each of the front and rear zones, wherein the audio signal transmitted to the directional loudspeaker relates to playback at the rear zone.

18 Claims, 3 Drawing Sheets

DUAL-ZONE AUTOMOTIVE MULTIMEDIA SYSTEM

CROSS-REFERENCE TO RELATED APPLICATIONS

This application claims the benefit of U.S. provisional application Ser. No. 62/979,811 filed Feb. 21, 2020, the disclosure of which is hereby incorporated in its entirety by reference herein.

TECHNICAL FIELD

Disclosed herein are dual-zone automotive multimedia systems.

BACKGROUND

Vehicles are often equipped with various infotainment systems including vehicle radio, screens for viewing movies, headphones, spatial audio systems, etc. Often vehicles carry multiple occupants, each wishing to use a different infotainment system. However, existing loudspeaker technology within the vehicle may prevent the separation of content between the various occupants.

SUMMARY

A dual-zone automotive multimedia system may include a first infotainment device associated with a front zone of a vehicle, at least one second infotainment device associated with a rear zone of a vehicle, wherein the at least one second infotainment device includes a directional loudspeaker arranged to face the rear zone of the vehicle; and a processor programmed to transmit first audio signals to the first infotainment device to create a first sound at the front zone, transmit second audio signals to the second infotainment devices to create a second sound at rear zone, wherein the at least one second infotainment device provides the second audio signal to the directional loudspeaker to playback the second sound at the rear zone.

An in-car audio system, may include a front infotainment device associated with a front zone of a vehicle, at least one rear infotainment device associated with a rear zone of a vehicle, wherein the at least one rear infotainment device includes a directional loudspeaker arranged to face the rear zone of the vehicle; and a processor programmed to transmit first audio signals to the front infotainment device to create a first sound at the front zone and to transmit second audio signals to the rear infotainment device to create a second sound at the rear zone, wherein the at least one second infotainment device provides the second signals to the directional loudspeaker relates to playback the sound at the rear zone.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
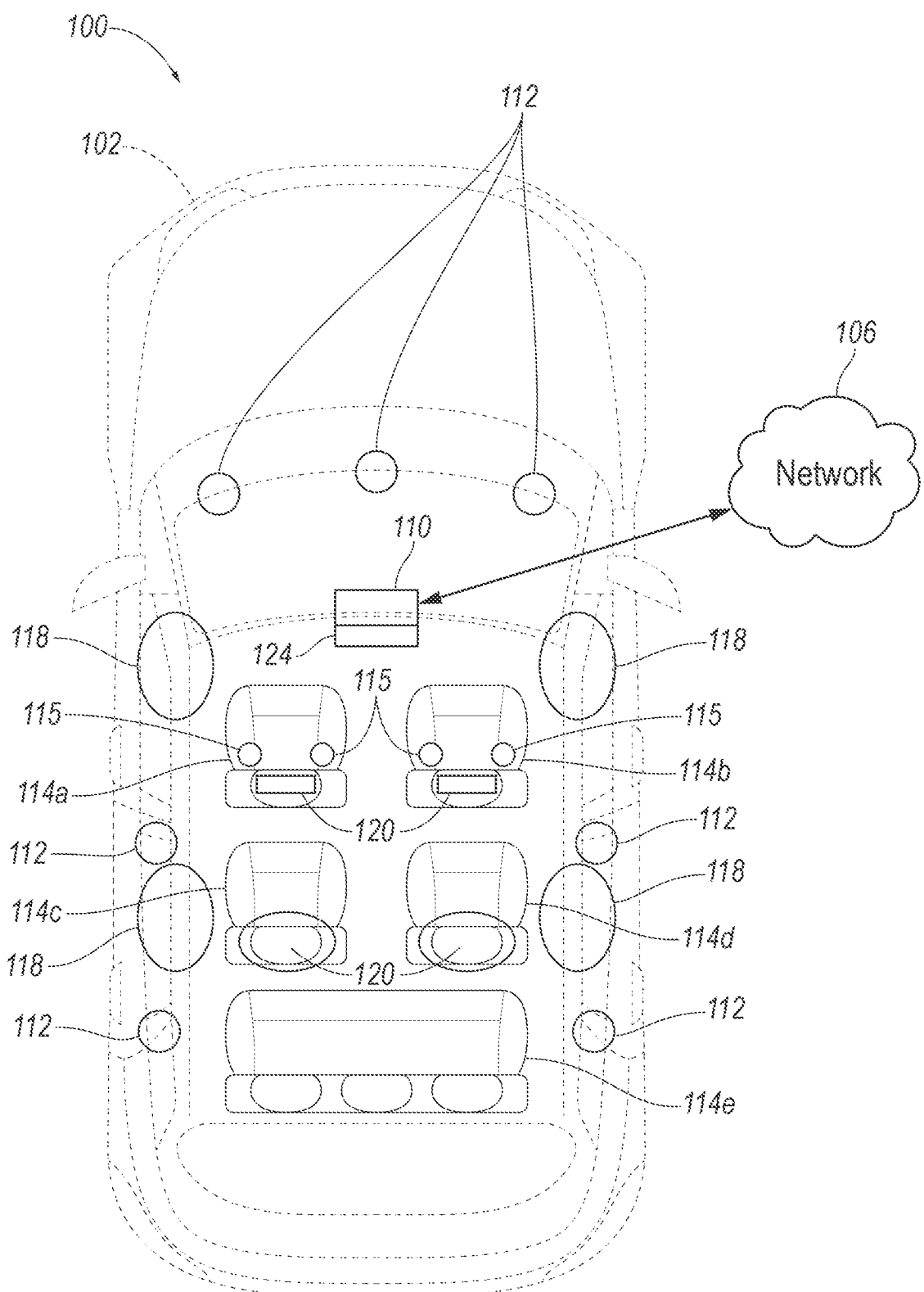
FIG. 1 illustrates an example audio system for a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a unique automotive audio system to allow the front row and the rear row occupants to each have an isolated listening experience with their personal content. In conjunction with the isolated audio experiences, the rear row may have a complete multimedia experience via rear-seat displays or interfaces. The front row may also have a complete multimedia experience (with visual content) to the fullest extent permissible. In this system, speaker architecture required has been greatly reduced for more realistic production and vehicle integration. The architecture is built on top of a typical premium branded audio system—for example, 12 speakers on 12 amplifier channels. This would typically include several door woofers, midranges, tweeters, and one or more subwoofers. In addition to these, the system requires a minimum of four total headrest speakers for the front seats (left and right for driver, left and right for passenger), plus a minimum of two total directional loudspeakers for the rear row.

The directional loudspeakers may be any highly-directional speaker having a high directivity index. The directional loudspeakers may be referred to herein as "rear-firing directional speakers." Specific examples of the highly-directional speakers include electrodynamic planar loudspeakers (EDPL). These loudspeakers have the benefit of being passively very directional, and also very thin and therefore easier to integrate and package in the vehicle. A highly-directional speaker may be placed on the back side of the front row headrest, and oriented towards the rear-row occupant's ears (rear-firing). From a DSP point of view, this system uses a similar core algorithm as ISZ and be optimized for two zones of content instead of four, and the inherent passive speaker separation is a large driver of performance.

Sound zone technologies generally have a positive correlation between hardware/software requirements (speakers, amplifier channels, processing power, etc.) and objective/subjective performance (acoustic separation between zones, perceptual separation, etc.). That is, small, low-complex sound zones system may lack in performance. Typically, designing a system with acceptable performance typically relies on very complex systems with large numbers of speakers and amplifier channels. This makes real-life implementation in a production automotive system very difficult.

The proposed system represents an effort to get the greatest performance out of a relatively small, lightweight system. By only adding six or more speakers/channels to an existing audio system, we are able to obtain nearly the same level of performance out of past systems requiring 12+ additional speakers/channels. A main driver of that hardware reduction is the placement and orientation of the rear-firing highly-directional speaker.

FIG. 1 illustrates an example vehicle audio system 100 for a vehicle 102. The system 100 may include the vehicle 102 and a remote network 106. The vehicle 102 may include a processor 110 arranged within a vehicle. The processor 110 may be included in the vehicle head unit, or a vehicle ECU. The processor 110 may include various vehicle systems such as navigation, infotainment, autonomous vehicle systems, etc. The processor 110 may include an audio system processor configured to determine when and where to audibly play certain audio signals within the vehicle 102. The vehicle processor 110 may each include a controller (not shown) configured to control various vehicle systems and devices.

The vehicle may include various seats 114. These seats 114 may be configured to contain a passenger during use of the vehicle. For example, a first seat 114a may be configured to be occupied by the driver, while a second seat 114b may be occupied by a front seat passenger. Rear seats 114c-e may be occupied by rear passengers.

The vehicle 102 may include a plurality of internal infotainment devices. The infotainment devices may include a first type of infotainment device 112. This type may be speakers or other devices typically included in a vehicle. The infotainment devices may include a second type of device 115 which may be headrest speakers. A third infotainment device may include a directional speaker 120. In general, the infotainment devices 112, 115, 120 may be devices configured to present content to a user, either audibly, visually, haptically, etc., within the vehicle cabin. For example, the infotainment devices 112, 115, 120 may include a vehicle speaker configured to present audible sounds within the vehicle 102. The infotainment devices 112, 115, 120 may include a display or projector configured to visually present information. One or more of these devices may make up the infotainment device 112, 115, 120. For example, the infotainment device 112, 115, 120 may include devices that provide both audio and video information (e.g., both a speaker and a display). Furthermore, the infotainment devices 112, 115, 120 may each provide content, or partial content to the user. For example, the directional speaker 120 may provide audible content to the vehicle passengers, while a display or HMI provides visual content.

As explained, the infotainment devices 112, 115, 120 may present content, such as media content including music, video, etc., to the vehicle occupants. The content may include various forms of infotainment, alerts, etc. In one example, the infotainment devices 112, 115, 120 may present and playback audio content as requested by the user at such as a specific radio station, artist, song, content, etc. In another example, the information may present requested navigation commands as defined by a driving route to a desired destination.

The infotainment devices 112, 115, 120 may be arranged at various locations throughout the vehicle 102. In the example shown in FIG. 1, the first infotainment devices 112 are arranged at the vehicle head unit, back headrests, sides of the vehicle, rear of the vehicle, etc. Furthermore, the infotainment devices 112 may be portable personal devices of each occupant such as the occupants' phone or tablet. More of less infotainment device 112, 115, 120 may be included in the vehicle 102. The processor 122 may receive commands from passengers and provide instructions to the various infotainment devices 112, 115, 120 based on those commands.

The first type of infotainment devices 112, as explained above, may include typical premium branded audio system, for example, 12 speakers on 12 amplifier channels. These would typically include several door woofers, midranges, tweeters, and one or more subwoofers. The second type of infotainment devices 115 may include total headrest speakers for the front seats (left and right for driver, left and right for passenger). The third type of infotainment device 120 may include directional loudspeakers arranged on the backside of a seat headrest to orient sound transmissions towards the rear-row occupant (e.g., the passenger behind the front row driver or passenger). These loudspeakers may be highly-directional speakers, for example, EDPLs. Other highly directional loudspeakers or any speaker with a high directivity index may also be used. The directional infotainment devices 120 allow for directional audio control. Additionally, the highly-directional speakers are thin, low profile loudspeakers that may be easily integrated and packaged into the vehicle. The directional loudspeaker 120 is oriented towards the rear-row occupants in order to increase their listening experience quality.

A front infotainment device 124 may be visible to the driver and front passenger and may present a human-machine-interface (HMI) for various operations, commands, etc., of the vehicle. For example, the front device 124 may manage the navigation, vehicle settings, etc. The front infotainment device 124 may also display content such as visual content for entertainment purposes when the vehicle is not in use. However, during use, such visual content may be limited to those passengers in the rear seats 114c-d.

By defining two zones, the front row (e.g., seats 114a and 114b), may have complete multimedia experiences while the rear row or rows may have a complete experience via rear-seat displays and interfaces. Thus, the system allows the front row and the rear row occupants to each have an isolated listening experience with their personal content.

The vehicle 102 may also include a plurality of interior microphones 118. The interior microphones 118 may be facing the interior of the vehicle 102 and may be configured to acquire ambient noise, voice sounds, and other acoustic events. The interior microphone 118 may include a microphone array, and more or less microphones may be included. Often, such microphones are arranged in the headliner or seatback.

The vehicle 102 may also include a plurality of exterior microphones facing exterior of the vehicle 102 and configured to acquire sounds exterior of the vehicle such as emergency vehicle sirens, traffic instructions, and other acoustic events. The exterior microphones may be arranged at various locations around the vehicle 102. More or less microphones may be included and the position of each in FIG. 1 is an example configuration. The noise acquired by the microphones, both exterior and interior, may be used by the processor 110 for active noise cancelation purposes.

The processor 122 may use individual sound zone (ISZ) technology to produce sounds at the directional loudspeakers 120 as well as an additional tuning application. The tuning application may optimize sound output for two zones of content instead of four. That is, the transfer function may tune the speaker. An inherent passive speaker separation may drive performance. Typically, such audio system performance would require large numbers of loudspeakers and amplifier channels. However, this integration of the highly-directional speakers allows for a more simplified real-life implementation. Thus, with only six or more additional speakers and channels, nearly the same level of performance may be achieved as those systems typically requiring 12 plus speakers and channels by simply placing two highly-directional speakers rear-facing from the front headrests.

In some examples the third type of infotainment device 120, e.g., the directional speakers, may be considered passive drivers of the sound zone performance. However, active cancellation techniques such as digital signal processing (DSP) may aid in further isolating the zones. This may be especially the case at low frequencies. For higher frequencies, passive cancelation may be more affective and may be facilitated by the loudspeaker 120, its placement location, The combination of active and passive control allows for a highly functional dual zone system that allows for personalized sound control within the zones. A certain amount of sound may 'bleed' between the zones. To negate some of this, an integrated noise cancellation system may be included and reduce the low-frequency propagation in all passenger seats.

The processor 110 may utilize various noise cancellation systems includes DSPs, hardware-based devices, including specialized microprocessors, etc. Users within each seat 114 may customize certain infotainment experiences. This may include certain audio settings, volume settings, equalizations, etc. The processor 110 may process these settings and customize the output to the respective loudspeaker 120 at that user's seat location.

In some examples, the sound may be generated using beamforming. Beamforming or spatial filtering is a signal processing technique used in loudspeaker or microphone arrays for directional signal transmission or reception. This is achieved by combining elements in a phased array in such a way that signals at particular angles experience constructive interference while others experience destructive interference.

Sound fields may also be realized using a sound field description with a technique called higher-order Ambisonics. Ambisonics is a full-sphere surround sound technique which may cover, in addition to the horizontal plane, sound sources above and below the listener. Unlike other multichannel surround formats, its transmission channels do not carry loudspeaker signals. Instead, they contain a loudspeaker-independent representation of a sound field, which is then decoded to the listener's loudspeaker setup. This offers the listener a considerable degree of flexibility as to the layout and number of loudspeakers used for playback. Ambisonics can be understood as a three-dimensional extension of mid/side (M/S) stereo, adding different additional channels for height and depth. In terms of first-order Ambisonics, the resulting signal set is called B-format. The spatial resolution of first-order Ambisonics is quite low. In practice, this translates to slightly blurry sources, and also to a comparably small usable listening area (also referred to as sweet spot or sweet area).

Although not shown, the vehicle 102 may include a connected vehicle system including one or more systems facilitated via connected car or connected vehicle telematics. These systems may include features available on a separate mobile device, usually a mobile device of the driver. The processor 110 of the vehicle 102 may communicate wirelessly with the mobile device (not shown) to access data within the mobile device such as an occupant's calendar, navigation system, GPS antenna, media content, etc. The data may include data specific and local to the mobile device of the occupant such as music, photos, etc. The data may also include dynamic data provided from external sources such as weather information, traffic information, etc. In addition to or in alternative to the connected vehicle system, the processor 110 may receive data from the network 106, other mobile devices, etc.

Figure 2:
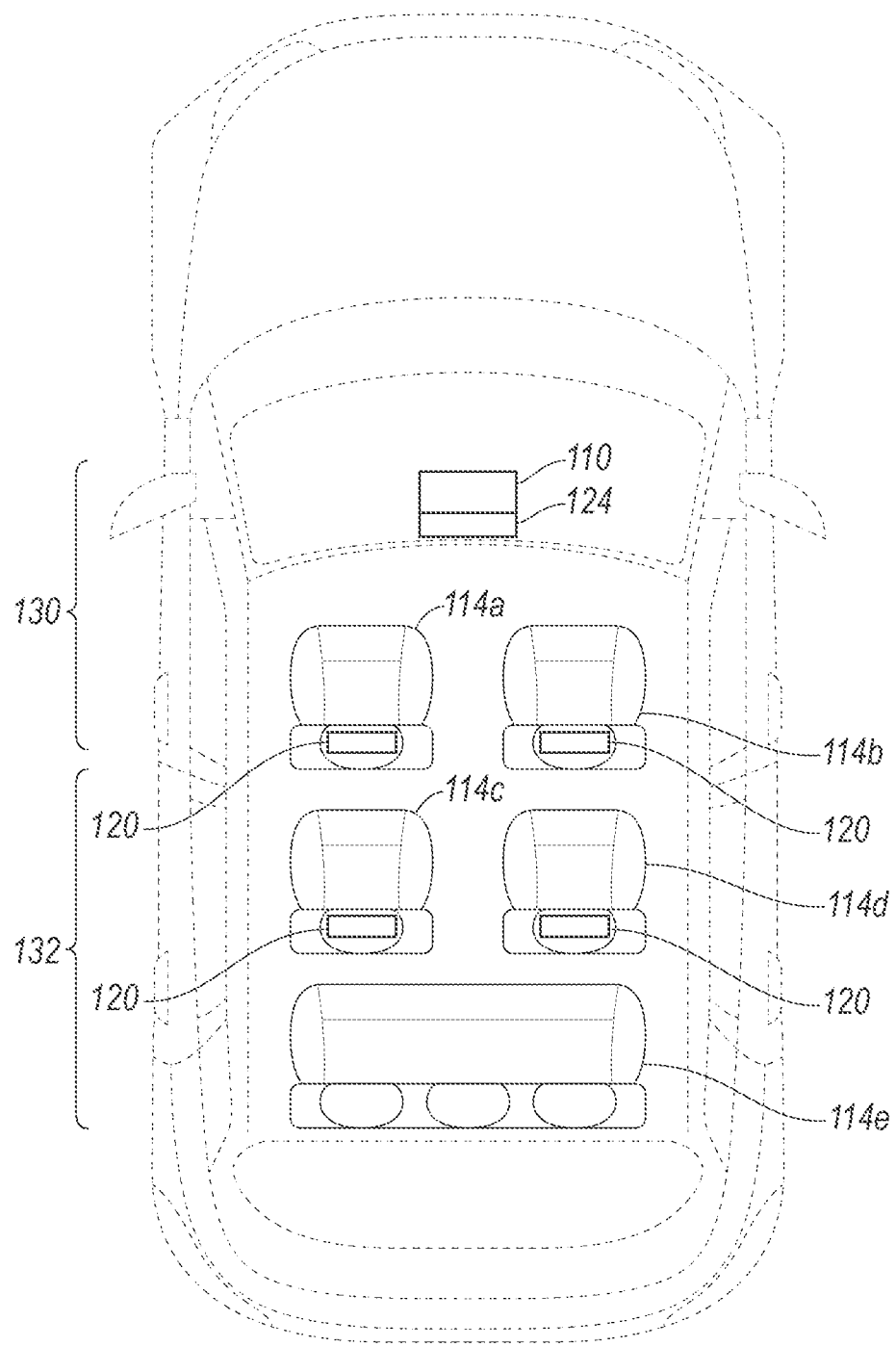
FIG. 2 illustrates another example audio system illustrating dual-zones.

FIG. 2 illustrates another example vehicle audio system 100 for a vehicle 102 where dual zones are illustrated including a first, or front zone 130 and a second, rear, or kid zone 132. More or less zones may be included and identified within the vehicle 102. In the example shown in FIG. 2, the front zone 130 is illustrated as having a front infotainment device 124, or front HMI. The rear zone 132 may be at any of the rear seats 114$c$-114$e$ and may include infotainment devices arranged at these locations. Content provided through the infotainment devices 112, 115, 120 may differ between the zones. While the rear seat occupants may enjoy a movie via the associated infotainment devices, e.g., infotainment devices 120, the front passengers, including the driver, may not. Thus, allocating of the zones may allow for zone specific content and infotainment management.

The second zone 132 may include at least one infotainment device specific to the second zone such as the directional infotainment devices 120. These devices 120 may be arranged in the second zone 132 in order to facilitate the audio for that zone. However, each zone may include one or more of the first type of infotainment device 112 and the second type of infotainment device 115, which may also facilitate enjoyment of the occupants in each zone.

Figure 3:
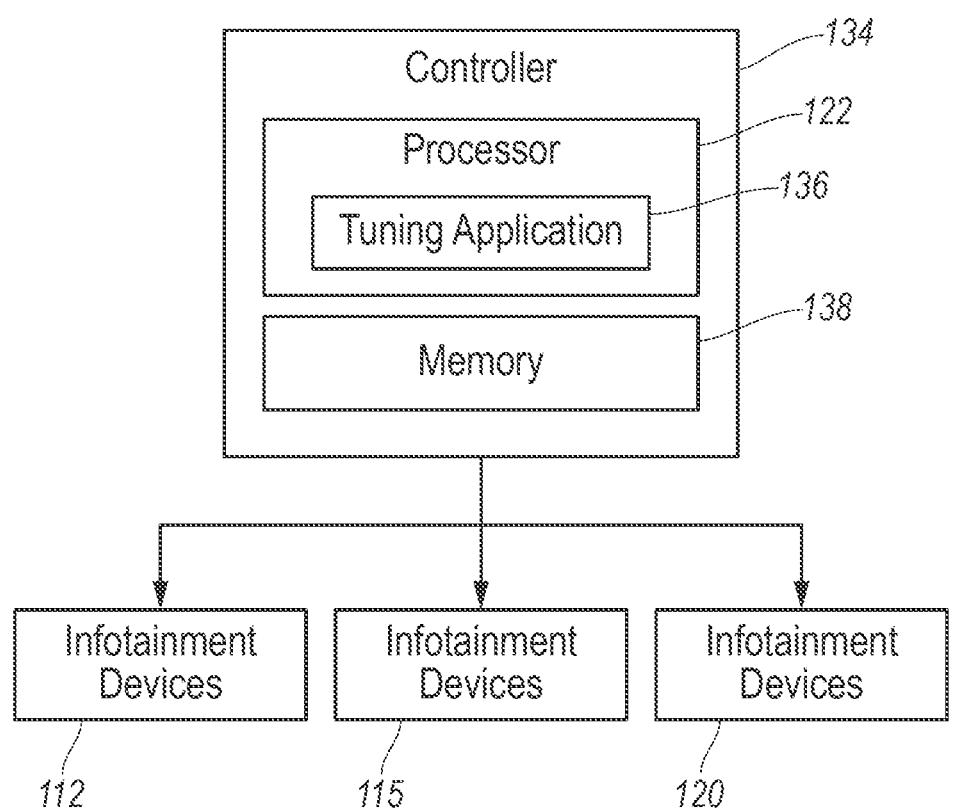
FIG. 3 illustrates an example block diagram of a portion of the audio system of FIG. 1.

FIG. 3 illustrates an example block diagram of a portion of the audio system for the vehicle of FIG. 1. The vehicle 102 may include a controller 134 that may control various vehicle operations including the audio system 100 of the vehicle 102. The processor 122 as described herein may be part of the controller 134 and may be configured to control various audio related devices such as the infotainment devices 112, 115, 120. The control may be based at least in part on instructions provided by the users/occupants such as via an HMI, audibly, etc. The control may also be based on the tuning application 136 which may also be based on certain user instructions, profiles and preferences to best optimize the listening experience for a specific passenger. The tuning application 136 may also generate and send instructions to the infotainment devices 112, 115, 120 based on the zone of the passenger. This may include passenger preferences, noise cancelation DSP, etc. The controller 134 includes memory 138 in addition to the processor 122 to perform the various operations as set forth herein.

Computing devices described herein generally include computer-executable instructions, where the instructions may be executable by one or more computing or hardware devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A dual-zone automotive multimedia system, comprising:
- a first infotainment device associated with a front zone of a vehicle;
- at least one second infotainment device associated with a rear zone of a vehicle, wherein the at least one second infotainment device includes a directional loudspeaker arranged to face the rear zone of the vehicle; and
- a processor programmed to:
  - transmit first audio signals to the first infotainment device to create a first sound at the front zone;
  - transmit second audio signals to the second infotainment devices to create a second sound at rear zone concurrent with the first sound and wherein the first audio signals are separate and distinct from the second audio signals,
- wherein the at least one second infotainment device provides the second audio signal to the directional loudspeaker to playback the second sound at the rear zone, the second sound isolated from the first sound.

2. The system of claim 1, wherein the processor is further programmed to apply noise cancellation to the first audio signals and the second audio signals prior to transmitting the first audio signals and the second audio signals to the first infotainment device and the second infotainment device, respectively.

3. The system of claim 2, wherein the noise cancelation includes active noise cancelation.

4. The system of claim 2, wherein the noise cancelation includes active noise cancelation based on sounds acquired from vehicle microphones and including the other of the respective first sound and second sound.

5. The system of claim 2, wherein the second infotainment device is configured as a passive driver of the multimedia system.

6. The system of claim 1, wherein the directional loudspeaker is an electrodynamic planar loudspeakers (EDPL).

7. The system of claim 1, wherein the directional loudspeaker is arranged in a vehicle headrest.

8. The system of claim 1, wherein the at least one second infotainment device includes at least two directional microphones for each zone.

9. The system of claim 1, wherein the at least one first infotainment device includes at least four directional microphones.

10. An in-car audio system, comprising:
- a front infotainment device associated with a front zone of a vehicle;
- at least one rear infotainment device associated with a rear zone of a vehicle, wherein the at least one rear infotainment device includes a directional loudspeaker arranged to face the rear zone of the vehicle; and
- a processor programmed to transmit first audio signals to the front infotainment device to create a first sound at the front zone and to transmit second audio signals to the rear infotainment device to create a second sound at the rear zone concurrent with the first sound, wherein the first audio signals are separate and distinct from the second audio signals
- wherein the at least one second infotainment device provides the second signals to the directional loudspeaker relates to playback the second sound at the rear zone, the second sound isolated from the first sound.

11. The system of claim 10, wherein the processor is further programmed to apply noise cancellation to the first audio signals and the second audio signals prior to transmitting the first audio signals and the second audio signals to the front infotainment device and the rear infotainment device, respectively.

12. The system of claim 11, wherein the noise cancelation includes active noise cancelation.

13. The system of claim 11, wherein the noise cancelation includes active noise cancelation based on sounds acquired from vehicle microphones and including the other of the respective first sound and second sound.

14. The system of claim 11, wherein the second infotainment device is configured as a passive driver of the audio system.

15. The system of claim 10, wherein the directional loudspeaker is an electrodynamic planar loudspeakers (EDPL).

16. The system of claim 10, wherein the directional loudspeaker is arranged in a vehicle headrest.

17. The system of claim 10, wherein the at least one rear infotainment device includes at least two directional microphones for each zone.

18. The system of claim 10, wherein the at least one front infotainment device includes at least four directional microphones.

* * * * *